United States Patent [19]

Wakabayashi

[11] 4,408,539
[45] Oct. 11, 1983

[54] OVERHEAD CONVEYOR

[75] Inventor: Takao Wakabayashi, Shinsenri-Minamimachi, Japan

[73] Assignee: Nakanishi Metal Works Co., Ltd., Osaka, Japan

[21] Appl. No.: 287,113

[22] Filed: Jul. 27, 1981

[51] Int. Cl.³ .................. B61B 3/00; E01B 25/24
[52] U.S. Cl. ............................. 104/89; 104/172 S; 105/149; 105/156; 198/680
[58] Field of Search .......... 104/89, 172 S, 119, 104/90, 91; 105/148, 149, 154, 155, 156; 198/680, 683, 686, 687, 477; 211/115, 116

[56] References Cited

U.S. PATENT DOCUMENTS 4,341,161  7/1982  Morita et al. ................. 104/89

FOREIGN PATENT DOCUMENTS 1809224  12/1969  Fed. Rep. of Germany ...... 198/680
2300133   7/1974  Fed. Rep. of Germany ...... 104/281
419140   11/1934  United Kingdom ............... 105/148

Primary Examiner—Bruce H. Stoner, Jr.
Assistant Examiner—R. G. Mathieu
Attorney, Agent, or Firm—Armstrong, Nikaido, Marmelstein & Kubovcik

[57] ABSTRACT

An overhead conveyor comprising a main rail, right and left two auxiliary rails arranged on the opposite sides of the main rail and positioned at a higher level in an upward slope section of the conveyor line and at a lower level in a downward slope section of the conveyor line, relative to their immediately previous horizontal position based on the main rail, a main running body forwardly movable along the main rail, auxiliary running bodies forwardly movable along the auxiliary rails following the main running body, and a front suspender and right and left rear suspenders connecting the main running body and the auxiliary running bodies to a hanger support positioned below the running bodies. The front and rear suspenders are pivotally movable forward and rearward and horizontally turnable. One of the rear suspenders comprises a forward-rearward pivotable member and a sidewise pivotable member connected to the lower end thereof. In a curved section, the main rail and the auxiliary rails are arranged on arcs of three concentric circles.

5 Claims, 9 Drawing Figures

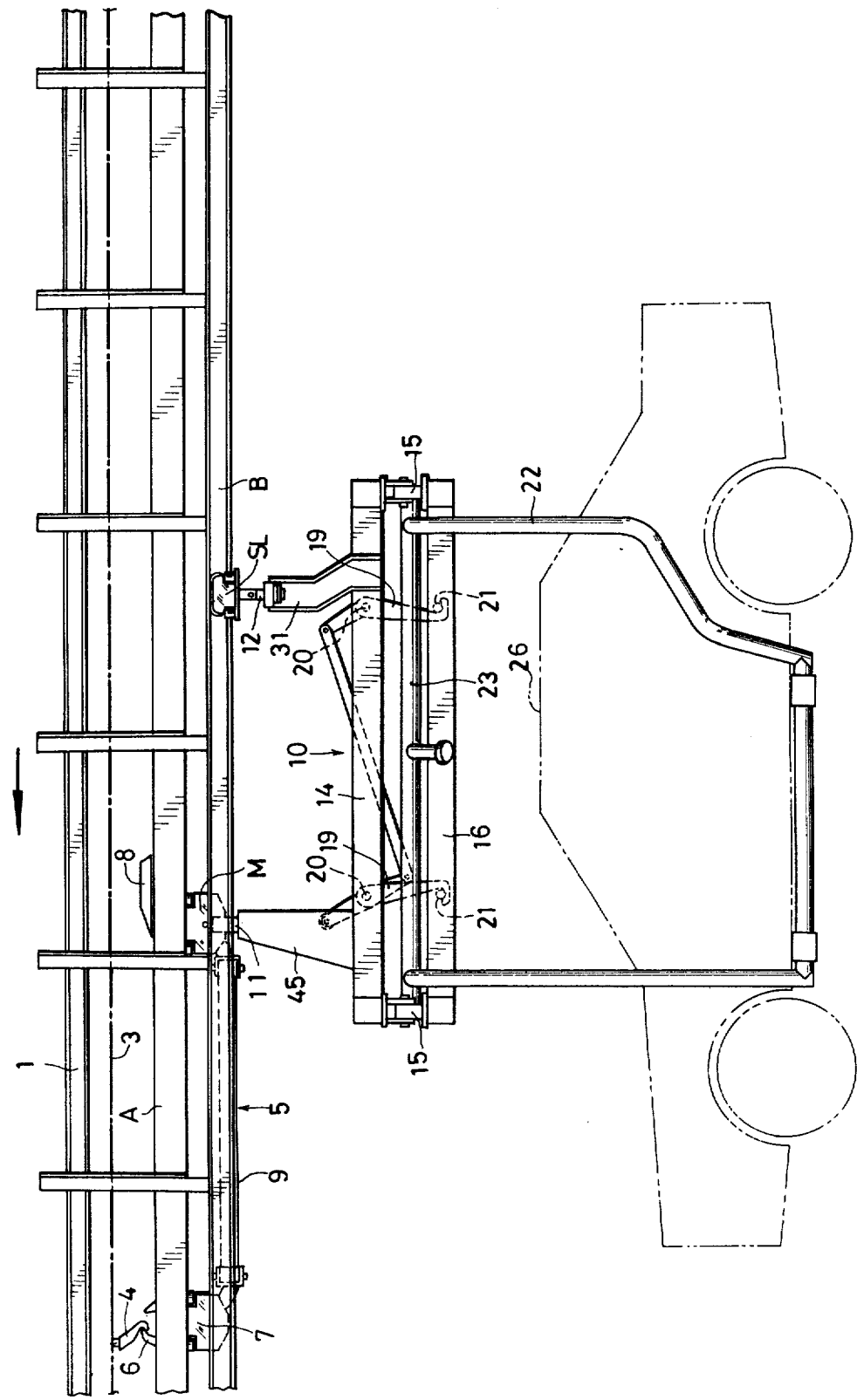

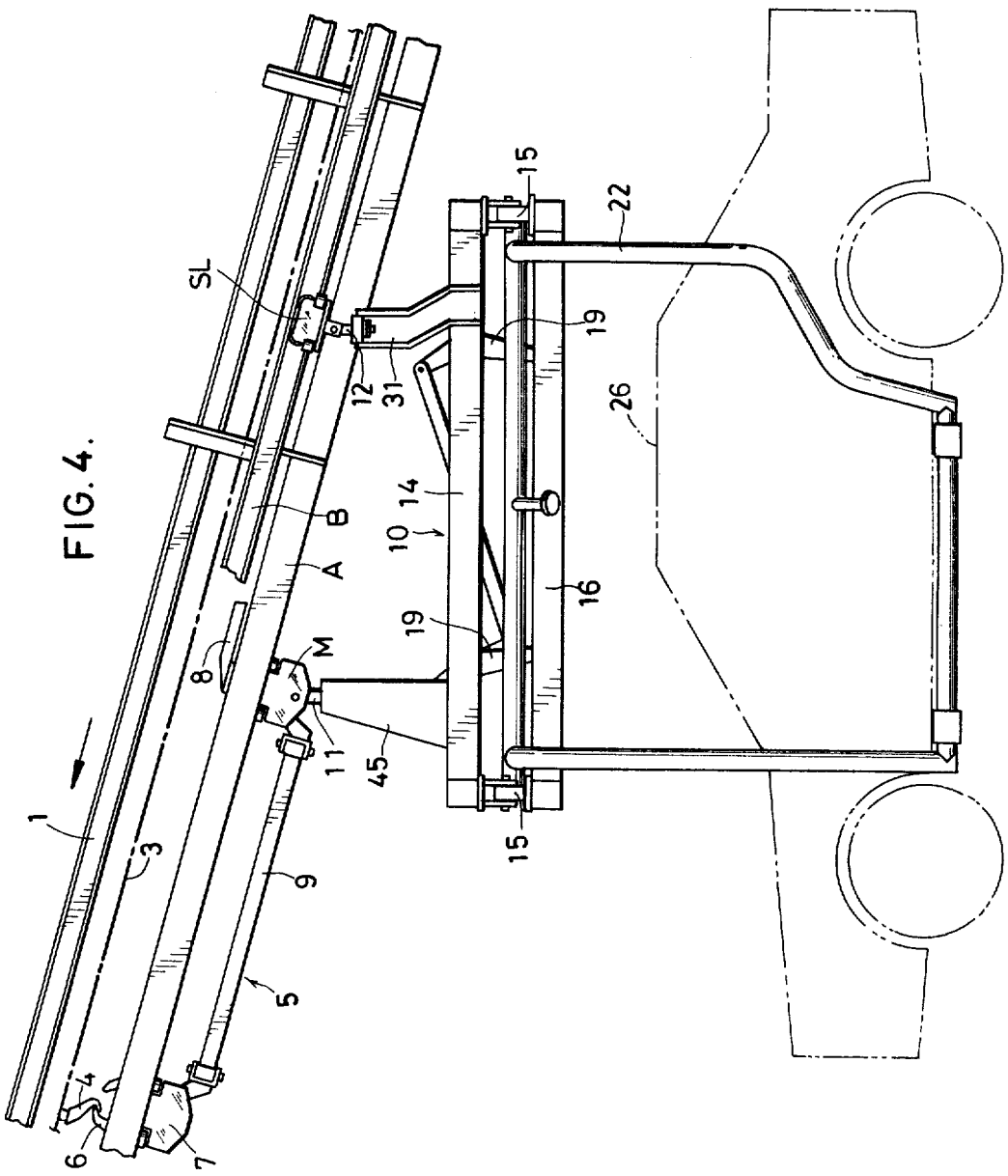

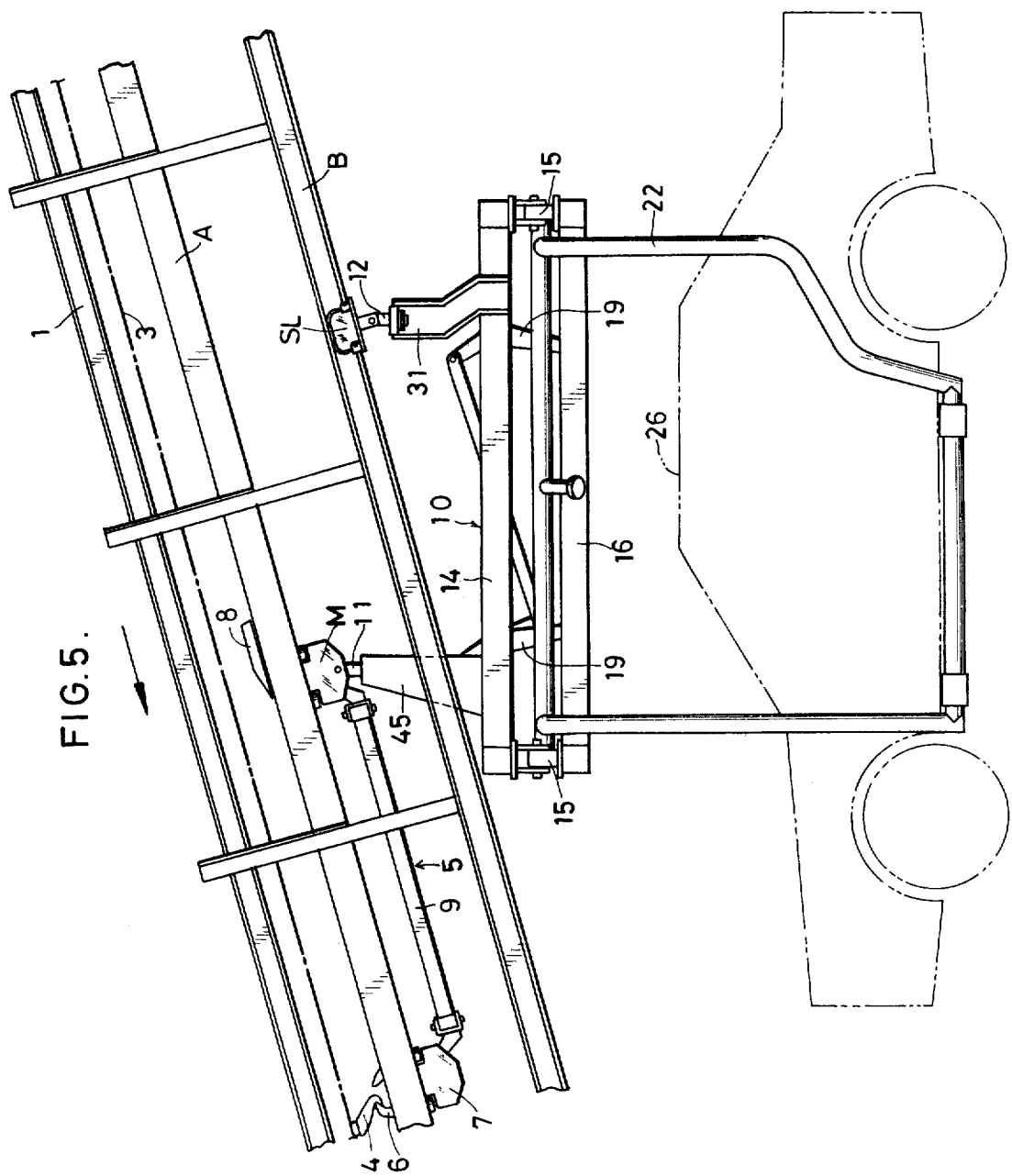

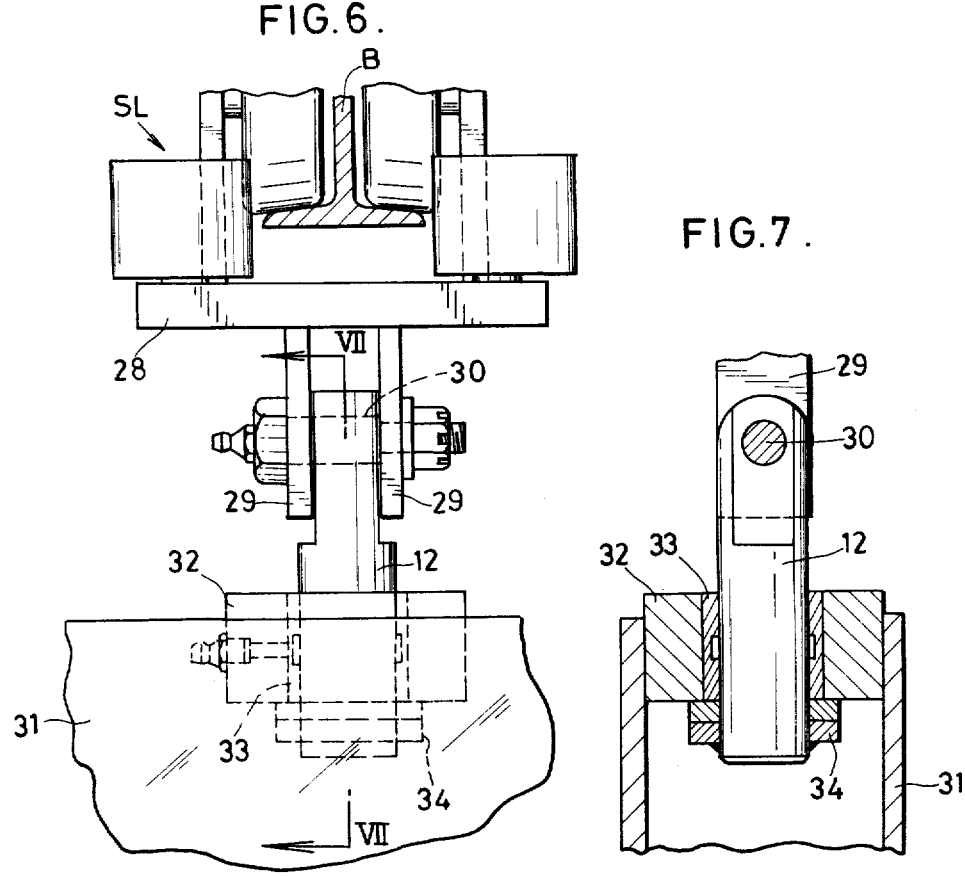

FIG. 8.
FIG. 9.
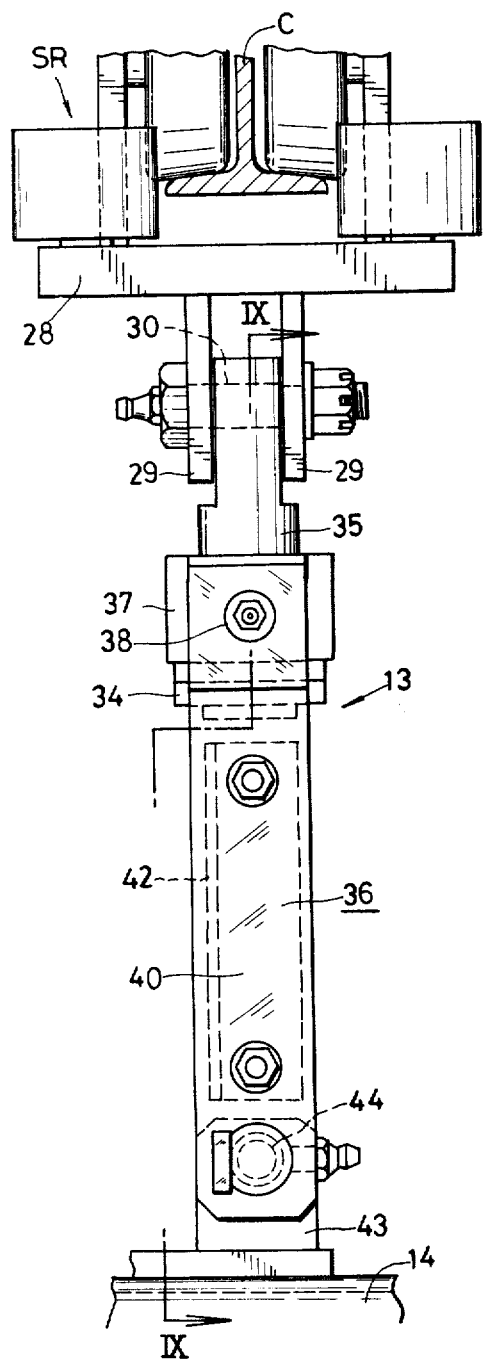
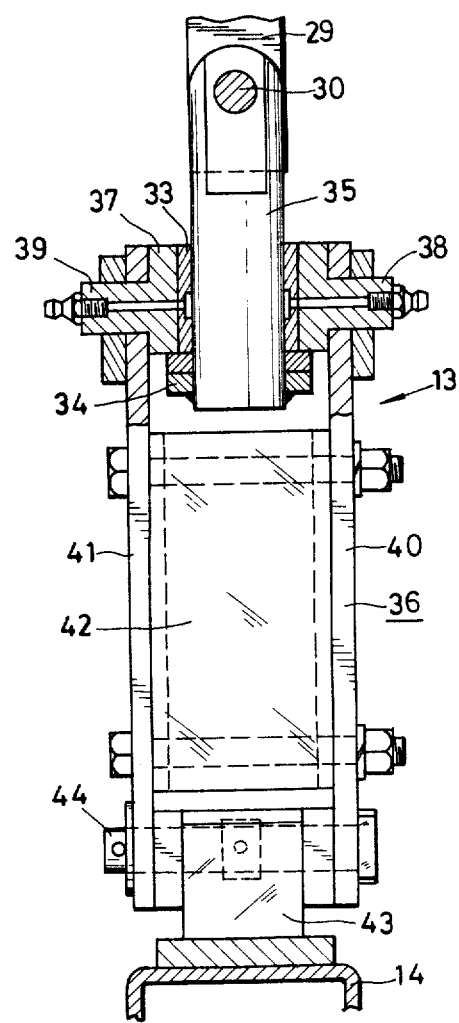

OVERHEAD CONVEYOR

BACKGROUND OF THE INVENTION

The present invention relates to an overhead conveyor, and more particularly to an arrangement for suspending a hanger support.

An overhead conveyor is already known which comprises a main rail, right and left two auxiliary rails arranged on the opposite sides of the main rail and positioned at a higher level in an upward slope section of the conveyor line and at a lower level in a downward slope section of the conveyor line, relative to their immediately previous horizontal position based on the main rail, a main running body forwardly movable along the main rail, auxiliary running bodies forwardly movable along the auxiliary rails following the main running body, and a front suspender and right and left rear suspenders connecting the main running body and the auxiliary running bodies respectively to a hanger support positioned below the running bodies, the front and rear suspenders being pivotally movable forward and rearward and horizontally turnable. With the conventional overhead conveyor, the main rail and one of the auxiliary rails can be arranged on arcs of two concentric circles in a curved section of the conveyor line, but it is impossible to install the other remaining auxiliary rail on an arc of a third concentric circle for the reason to be described later with reference to FIG. 1. Accordingly the drawing for the design of the remaining auxiliary rail requires much time, while the rail is very cumbersome to make.

SUMMARY OF THE INVENTION

The main object of the present invention is to overcome the problems heretofore experienced in making rails for use in curved sections and to provide an improved overhead conveyor. Stated specifically, the present invention provides an overhead conveyor comprising a main rail, right and left two auxiliary rails arranged on the opposite sides of the main rail and positioned at a higher level in an upward slope section of the conveyor line and at a lower level in a downward slope section of the conveyor line, relative to their immediately previous horizontal position based on the main rail, a main running body forwardly movable along the main rail, auxiliary running bodies forwardly movable along the auxiliary rails following the main running body, and a front suspender and right and left rear suspenders connecting the main running body and the auxiliary running bodies respectively to a hanger support positioned below the running bodies, the front and rear suspenders being pivotally movable forward and rearward and horizontally turnable, one of the right and left rear suspenders comprising a forward-rearward pivotable member and a sidewise pivotable member connected to the lower end thereof, whereby the main rail and the auxiliary rails can be arranged on arcs of three concentric circles in a curved section. Accordingly the drawing for designing all the rails can be made in an exceedingly shorter priod of time than heretofore required, while the rail which has been difficult to make for use in curved sections can be fabricated with ease.

The invention will be described in greater detail with reference to the accompanying drawings.

BRIEF DESCRIPTION OF THE DRAWINGS

FIG. 3 is a side elevation showing the overhead conveyor of FIG. 2;

FIG. 4 is a side elevation corresponding to FIG. 3 and showing the same in an upward slope section;

FIG. 5 is a side elevation corresponding to FIG. 3 and showing the same in a downward slope section;

FIG. 6 is an enlarged sectional view showing the portion VI in FIG. 2;

FIG. 7 is a view in section taken along the line VII—VII in FIG. 6;

FIG. 8 is an enlarged sectional view showing the portion VIII in FIG. 2; and

FIG. 9 is a view in section taken along the line IX—IX in FIG. 8.

DESCRIPTION OF THE PREFERRED EMBODIMENT

Figure 2:
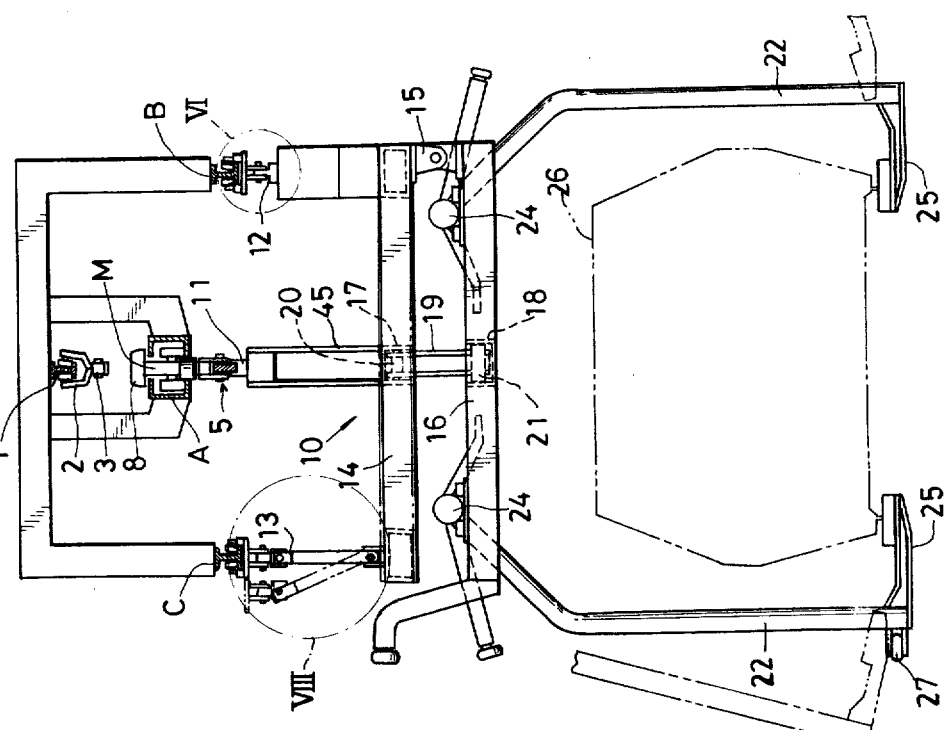
FIG. 2 is a front view in section showing an improved overhead conveyor according to the invention.

Throughout the specification and the appended claims, the term "right" refers to the right-hand side of a person facing toward the direction of advance of the running bodies, namely the left-hand side of FIG. 2, and the term "left" to the left-hand side of the person, i.e. the right-hand side of FIG. 2.

Figure 1:
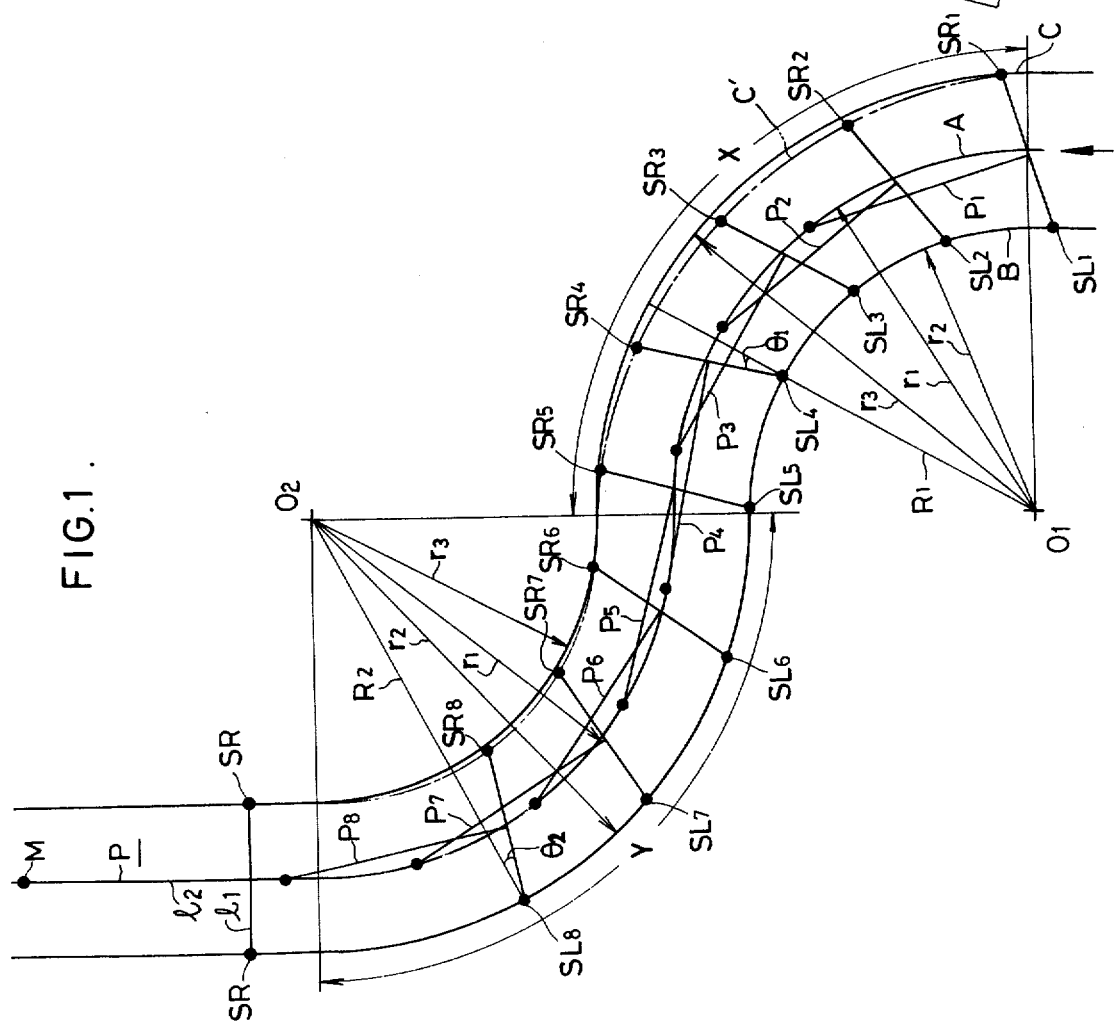
FIG. 1 is a diagram showing an arrangement of a main rail and opposite auxiliary rails in curved sections to illustrate the invention in comparison with the prior art.

FIG. 1 shows an arrangement of a main rail and right and left auxiliary rails in S-shaped curved portions according to the invention. In a first curved section X, the main rail A and left and right auxiliary rails B, C are arranged on arcs of concentric circles centered about the same point 01 and having radii r1, r2 and r3. In a second curved section Y, the main rail A and left and right auxiliary rails B, C are arranged on arcs of concentric circles centered about the same point 02 and having the radii r1, r2 and r3. When the main rail A and the left auxiliary rail B are arranged on arcs of two concentric circles in the case of conventional conveyors of the type described, the right auxiliary rail C can not be positioned on an arc of the third concentric circle but must invariably be positioned slightly nearer to the arc on which the main rail A is arranged. The right auxiliary rail thus positioned is indicated at C'. This arrangement is attributable to the following reason. For convenience of illustration, a leading trolley having attached thereto a front suspender on a main running body is indicated at M, and following trolleys having attached thereto rear suspenders on right and left auxiliary running bodies are designated at SR and SL. A T-shaped figure P is drawn which is composed of a line 11 interconnecting the trolleys SR and SL and a line 12 connecting the midpoint of the line 11 to the leading trolley M. When the right following trolley SR advances through the first and second curved sections X and Y without deforming the T-shaped figure P, the path of travel of the trolley SR matches the circular arc of the right auxiliary rail C'. If the right and left following trolleys SR and SL are positioned always as aligned on radial lines R1, R2 through the center points 01, 02, the right following trolley SR can be positioned on the arc of the right auxiliary rail C. In the first curved section X, however, the right following trolley SR is at all times ahead of the left following trolley SL with respect to the radial line R1, such that the line 11 interconnecting SR and SL is forwardly inclined from the radial line R1 at an angle $\theta 1$. In the second curved section Y, the right following trolley SR is at all times behind the left following trolley SL with respect to the radial line R2, the line 11 being rearwardly inclined from the radial line R2 at an angle $\theta 2$. Thus the right following trolley SR is unable to travel along the auxiliary rail C. Indicated at Pn, Mn, SRn and SLn in FIG. 1 are successive locations of the T-shaped figure, leading trolley, right and left following trolleys during travel. In the prior art, the locus of SRn is determined for the drawing, design and fabrication of the right auxiliary rail C'. If the main rail A and the right auxiliary rail C are arranged on arcs of two concentric circles, the left auxiliary rail must inevitably be positioned slightly nearer to the arc of the main rail A than the arc B for the same reason as described above.

FIGS. 2 and 3 show a power-and-free conveyor as a specific embodiment of the invention. The conveyor includes a power rail 1, a drive chain 3 suspended from the rail 1 by a plurality of trolleys 2 and a pusher 4 provided for every specified number of trolleys 2. A specified distance below the power rail 1, a free rail, namely main rail A, extends in parallel to the power rail 1. Two auxiliary rails B and C are arranged on the opposite sides of the main rail A. As seen in FIGS. 2 and 3, the auxiliary rails B and C are positioned slightly below the main rail A in a horizontal section of the conveyor line. The auxiliary rails are positioned above the main rail A in an upward slope section of the conveyor line as seen in FIG. 4. In a downward slope section, the auxiliary rails are at a lower level than their position in the horizontal section, a greater distance away from the main rail A as shown in FIG. 5. Each of main running bodies 5 forwardly movable along the main rail A comprises a front leading trolley 7 having a dog 6 engageable with the pusher 4, a rear leading trolley M having a pusher raising cam 8 and a connecting bar 9 extending along the rail A and interconnecting the trolleys 7, M. Following the main running body 5 are auxiliary running bodies, namely following trolleys SR, SL, which are forwardly movable along the right and left auxiliary rails C, B. The main running body 5 and the auxiliary running bodies SR, SL are connected to a hanger support 10 positioned below these running bodies, respectively by a front suspender 11 extending downward from the rear leading trolley M and right and left rear suspenders 13, 12 extending downward from the following trolleys SR, SL. The hanger support 10 comprises a rectangular upper frame 14 and a lower frame 16 of identical shape connected thereto by hinges 15 at front and rear left side portions. A channel member 17 with its opening directed downward extends at the center of the upper frame 14 longitudinally thereof and is fixed to the frame 14. A channel member 18 with its opening directed upward extends at the center of the lower frame 16 longitudinally thereof and is fixed to the frame 16 in opposed relation to the channel member 17. Front and rear hooks 19 are pivoted to the upper channel member 17 by pins 20. The lower channel members 18 has front and rear pins 21. The hooks 19 extend downward and are engaged with the pins 21, whereby the lower frame 16 is held in parallel to the upper frame 14. A rod 23 extending longitudinally of the lower frame 16 is turnably supported by bearings 24 on the lower frame 16 at each of its opposite sides. The rod 23 has fixed thereto a hanger 22 which is substantially U-shaped when seen from one side. The lower ends of the opposite hangers 22 extend horizontally toward each other inwardly of the support 10 to provide receiving portions 25. The work 26 to be conveyed is placed on the receiving portions 25. The right hanger 22 has at its lower end a horizontal roller 27 projecting outward. When there arises a need to tilt the work 26 sidewise during operation, the hooks 19 are disengaged from the pins 21, rendering the lower frame 16 turnable about the pins of the hinges 15. The degree of inclination of the lower frame 16 is determined by causing the roller 27 at the lower end of the hanger 22 to roll on a rail (not shown) disposed at a predetermined level.

FIGS. 6 and 7 show the left rear suspender 12 in greater detail. The suspender 12, which is in the form of a short round rod, has an upper end formed with flat opposite side faces and turnably attached by a sidewise pin 30 to a pair of opposed projections 29 spaced apart from each other and extending downward from a bottom plate 28 of the left auxiliary running body, i.e. left following trolly SL. The upper frame 14 of the hanger support 10 has a channel member 31 extending upward from a left side rear portion thereof. A block 32 having a bore extending therethrough is fixed to the upper end of the channel member 31. A bush 33 is fitted in the bore. The lower end of the suspender 12 extends through the bush 33 and slightly projects downward from the block 32. A flange 34 formed at the projecting end of the suspender 12 supports the block 32 thereon. The block 32 is turnable relative to the suspender 12.

The front suspender 11 is connected to the hanger support 10 substantially in the same manner as the left rear suspender 12 described above. Both the suspenders 11 and 12 are pivotally movable forward and backward and are also horizontally turnable. The block on the lower end of the front suspender 11 is fixed to the upper end of a channel member 45 upwardly extending from the front end of the channel member 17 of the upper frame 14.

FIGS. 8 and 9 show the right rear suspender 13. The suspender 13 comprises a forward-rearward pivotable member 35 and a sidewise pivotable member 36 connected to the lower end thereof. Throughout FIGS. 6 to 9, like parts are referred to by like reference numbers, and the forward-rearward pivotable member 35 will not be described in detail since the member 35 is substantially similar to the left rear suspender 12 except that the member 35 is attached to the right auxiliary running body, i.e. right following trolley SR, and that the block on the member 35 serves as a joint for connecting the member 36 to the member 35. A joint 37 at the lower end of the forward-rearward pivotable member 35 is integral with pins 38, 39 extending forward and rearward from the front and rear sides of the joint respectively. The sidewise pivotable member 36 comprises a pair of vertically elongated front and rear plates 40, 41 and a channel-shaped spacer 42 provided between the plates 40, 41 except at the upper and lower ends thereof. The upper ends of the plates 40, 41 are turnably attached to the member 35 by the pins 38, 39. The lower ends of the plates 40, 41 are turnably attached to an upward projection 43 on a left side rear portion of the hanger support 10 by a pin 44 extending longitudinally of the support, with the projection 43 held between the plates. Like the front suspender 11 and the left rear suspender 12, the right rear suspender 13 is pivotally movable forward and backward and is also horizontally turnable. In addition, the suspender 13 is pivotally movable rightward and leftward.

In the upward slope section and downward slope section of the conveyor line shown in FIGS. 4 and 5, all the suspenders 11, 12 and 13, which are pivotally movable forward and rearward, are held in a vertical position by gravity, maintaining the hanger support 10 in a horizontal position at all times.

In the curved sections of the conveyor line shown in FIG. 1, the running bodies encounter no trouble since the suspenders 11 to 13 are all horizontally turnable. In addition, since the right rear suspender 13 is pivotally movable sidewise, a smooth conveying operation is assured even when the main rail A and auxiliary rails B, C are arranged on arcs of three concentric circles. It is to be noted that the right auxiliary rail C shown in broken lines in FIG. 2 does not indicate a variation in the distance between the opposite auxiliary rails B and C. In the prior art, neither of the right and left rear suspenders is movable sidewise and accordingly the right following trolley SR needs to roll along the right auxiliary rail C' in curved sections, whereas the right rear suspender 13 which is movable sidewise according to the invention enables the trolley SR to advance along the right auxiliary rail C. Thus the broken-line rail C in FIG. 2 is intended to illustrate this feature of the invention.

The construction of the left rear suspender and that of the right rear suspender according to the embodiment described are replaceable by each other. Furthermore the overhead conveyor is not limited to a power-and-free conveyor. The front suspender which is attached to the rear leading trolley can be attached to any portion of the main running body, while the main running body may be provided with one or three or more leading trolleys. The type of auxiliary running bodies is not limited to the illustrated example.

What is claimed is:

1. An overhead conveyor comprising a main rail, right and left two auxiliary rails arranged on the opposite sides of the main rail and positioned at a higher level in an upward slope section of the conveyor line and at a lower level in a downward slope section of the conveyor line, relative to their immediately previous horizontal position based on the main rail, a main running body forwardly movable along the main rail, auxiliary running bodies forwardly movable along the auxiliary rails following the main running body, and a front suspender and right and left rear suspenders connecting the main running body and the auxiliary running bodies respectively to a hanger support positioned below the running bodies, the front and rear suspenders being pivotally movable forward and rearward and horizontally turnable, one of the right and left rear suspenders comprising a forward-rearward pivotable member and a sidewise pivotable member connected to the lower end thereof, whereby the main rail and the auxiliary rails can be arranged on arcs of three concentric circles in a curved section.

2. An overhead conveyor as defined in claim 1 wherein the forward-rearward pivotable member is a round rod and has an upper end turnably attached by a sidewise pin to a pair of opposed porjections spaced apart from each other and extending downward from a bottom plate of the auxiliary running body, the forward-rearward pivotable member being provided at its lower end with a horizontally turnable joint for connecting the sidewise pivotable member to the forward-rearward pivotable member.

3. An overhead conveyor as defined in claim 2 wherein the lower end of the forward-rearward pivotable member is inserted through a bore extending centrally through the joint, and the joint is supported by a flange formed at the projecting end of the forward-rearward pivotable member.

4. An overhead conveyor as defined in claim 2 wherein the joint is integral with pins extending forward and rearward from the front and rear sides thereof.

5. An overhead conveyor as defined in claim 4 wherein the sidewise pivotable member comprises a pair of front and rear vertically elongated plates and a spacer provided between the vertically elongated plates except at the upper and lower ends thereof, the upper ends of the elongated plates being turnably attached to the forward-rearward pivotable member by the forward and rearward pins on the joint, the lower ends of the elongated plates being turnably attached to an upward projection on the upper side of the hanger support by a pin extending longitudinally of the support with the projection held between the plates.

* * * * *